United States Patent
Kong et al.

(10) Patent No.: US 11,472,917 B2
(45) Date of Patent: Oct. 18, 2022

(54) 3,4-ETHYLENEDIOXYTHIOPHENE (EDOT) POLYMER CAPABLE OF SUPERASSEMBLING WITH CARBON-BASED MATERIALS, AND ITS PREPARATION METHOD

(71) Applicant: FUDAN UNIVERSITY, Shanghai (CN)

(72) Inventors: Biao Kong, Shanghai (CN); Lei Xie, Shanghai (CN); Jichao Li, Shanghai (CN); Jie Zeng, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 17/058,499

(22) PCT Filed: Jun. 5, 2020

(86) PCT No.: PCT/CN2020/094512
§ 371 (c)(1),
(2) Date: Nov. 24, 2020

(87) PCT Pub. No.: WO2020/244609
PCT Pub. Date: Dec. 10, 2020

(65) Prior Publication Data
US 2021/0261724 A1    Aug. 26, 2021

(30) Foreign Application Priority Data

Jun. 5, 2019    (CN) .......................... 201910487971.6

(51) Int. Cl.
*C08G 61/12*    (2006.01)
*C08K 3/04*    (2006.01)
*C08J 3/14*    (2006.01)

(52) U.S. Cl.
CPC .............. *C08G 61/126* (2013.01); *C08J 3/14* (2013.01); *C08K 3/041* (2017.05); *C08G 2261/11* (2013.01); *C08G 2261/3243* (2013.01)

(58) Field of Classification Search
CPC .............. C08G 61/126; C08G 2261/11; C08G 2261/3243; C08K 3/041; C08J 3/14
See application file for complete search history.

(56) References Cited

U.S. PATENT DOCUMENTS

2007/0249802 A1* 10/2007 Zhu ...................... C08G 61/122
528/394

FOREIGN PATENT DOCUMENTS

| CN | 102161816 A | 8/2011 |
| CN | 102286013 A | 12/2011 |

(Continued)

OTHER PUBLICATIONS

Muhammad S. Khan et al.; "Synthesis and characterization of platinum(II) di-ynes and poly-ynes incorporating ethylenedioxythiophene (EDOT) spacers in the backbone"; Dalton Trans.; Jul. 2011, vol. 40; pp. 10174-10183.

(Continued)

*Primary Examiner* — Shane Fang
(74) *Attorney, Agent, or Firm* — Dickinson Wright PLLC

(57) ABSTRACT

The present invention belongs to the technical field of organic supermolecules, and specifically discloses a 3,4-ethylenedioxythiophene (EDOT) polymer capable of supramolecular assembly with carbon-based materials, and a preparation method thereof. The polymer of the present invention is a polymer with 3,4-ethylenedioxythiophene-2-acetylene as the main chain and alkoxy as the side chain. The polymer is prepared as follows: subjecting EDOT to bromination, to give 2,5-dibromo-3,4-ethylenedioxythiophene; then reacting 2,5-dibromo-3,4-ethylenedioxythiophene and (Continued)

trimethylsilyl acetylene (TMSA) to give bis(trimethylsilyl)-3,4-ethylenedioxythiophene; removing trimethylsilyl (TMS) protecting groups from the bis(trimethylsilyl)-3,4-ethylenedioxythiophene, and subjecting the obtained compound and 2,5-dibromo-3,4-ethylenedioxythiophene to Sonogashira coupling to give an EDOT polymer. The polymer of the present invention can form a supramolecular assembly system with carbon nanotubes (CNTs), which involves π-π adsorption of the main chain and entanglement of the side chain.

9 Claims, 4 Drawing Sheets

(56) References Cited

FOREIGN PATENT DOCUMENTS

| | | |
|---|---|---|
| CN | 102432982 A | 5/2012 |
| CN | 110283303 A | 9/2019 |
| JP | 2010031157 A | 2/2010 |

OTHER PUBLICATIONS

Xiaoyong Zhao; "Conjugated Polyelectrolytes Based on Poly(Arylene Ethynylene): Synthesis, Solution Photophysics and Applications to Sensors and Solar Cells"; Dissertation Presented to the Graduate School of the University of Florida in Partial Fulfillment of the Requirements for the Degree of Doctor of Philosophy; Dec. 2007.

\* cited by examiner

3,4-ETHYLENEDIOXYTHIOPHENE (EDOT) POLYMER CAPABLE OF SUPERASSEMBLING WITH CARBON-BASED MATERIALS, AND ITS PREPARATION METHOD

TECHNICAL FIELD

The present invention belongs to the technical field of organic supermolecules, and specifically relates to a 3,4-ethylenedioxythiophene (EDOT) polymer capable of supramolecular assembly with carbon-based materials, and its preparation method.

BACKGROUND

Self-assembly refers to a technology in Which basic structural units (molecules, nanomaterials, micron- or larger-scale substances) spontaneously form an ordered structure. During the process of self-assembly, the basic structural units are spontaneously organized or aggregated into a stable structure with a certain regular geometric appearance under the non-covalent interaction.

Carbon nanotubes (CNTs) are a type of nanomaterial with hexagonal structures as the main linking groups, which have excellent mechanical, electrical and chemical properties. There are single-wall carbon nanotubes (SWCNTs) and multi-wall carbon nanotubes (MWCNTs), which have a relatively-wide size range. Commonly, CNTs have a diameter of 2 nm to 100 nm and a length of 10 μm to 200 μm. Due to the strong van der Waals forces among tube walls, CNTs are often agglomerated, entangled or knotted, which limits the mechanical properties and other properties of CNTs and also restricts the industrial application of CNTs.

SUMMARY

In order to overcome the known defects with existing CNTs, including being easy to agglomerate and difficult to disperse, the present invention provides an EDOT polymer capable of supramolecular assembly with carbon-based materials, and its preparation method.

The EDOT polymer capable of supramolecular assembly with carbon-based materials provided in the present invention is a polymer with repeating 3,4-ethylenedioxythiophene-2-acetylene units as the main chain and all oxy as the side chain. The polymer can form a supramolecular assembly system with CNTs of different sizes through π-π adsorption of the main chain and entanglement of the side chain. The EDOT polymer/CNT composite formed from the supramolecular assembly system exhibits excellent stability, and has promising application prospects in composite materials.

The EDOT polymer capable of supramolecular assembly with carbon-based materials provided by the present invention has a structure shown in the following general formula:

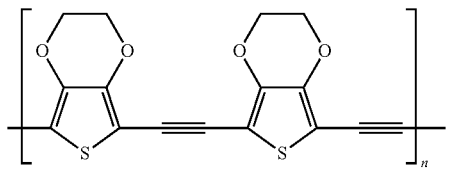

where, n is a natural number greater than zero.

The present invention also provides a method for preparing an EDOT polymer having the above formula, including the following specific steps:

(1) subjecting EDOT to bromination to give 2,5-dibromo-3,4-ethylenedioxythiophene;

(2) reacting 2,5-dibromo-3,4-ethylenedioxythiophene with trimethylsilyl acetylene (TMSA) to give bis(trimethylsilyl)-3,4-ethylenedioxythiophene, and then removing the trimethylsilyl (TMS) groups from the bis(trimethylsilyl)-3,4-ethylenedioxythiophene to give alkynyl-terminated 3,4-ethylenedioxythiophene;

(3) subjecting the alkynyl-terminated 3,4-ethylenedioxythiophene and 2,5-dibromo-3,4-ethylenedioxythiophene to Sonogashira coupling to give an EDOT polymer having the formula shown above.

In some embodiments, the Sonogashira coupling is conducted by the following specific steps: under a nitrogen atmosphere, adding 2,5-di bromo-3,4-ethylenedioxythiophene, the alkynyl-terminated thiophene, CuI, tetrakis(triphenylphosphine)palladium(0) and triphenylphosphine to a reaction flask, and then adding toluene and triethylamine (TEA); after nitrogen replacement is conducted, subjecting the mixture to reaction at a high temperature (65° C. to 75° C. (preferably 70° C.)) for a certain period of time; then subjecting the reaction solution to extraction, drying and concentration to give a yellow viscous liquid; and then subjecting the yellow viscous liquid to methanol/tetrahydrofuran (THE) precipitation to give a yellow solid powder.

In some embodiments, the EDOT and bromine water have a molar ratio of 1:(2.1-2.5).

The present invention also provides an EDOT polymer synthesized by the above method.

The present invention also provides a supramolecular self-assembly system of CNTs, and the functional substance in the self-assembly system is an EDOT polymer.

The present invention also provides the use of the EDOT polymer in the preparation of CNT composite materials and composite materials containing a supramolecular self-assembly system of CNTs.

The present invention provides the following beneficial effects:

(1) The EDOT polymer provided in the present invention adsorbs CNTs by the main chain and entangles CNTs by side chains, which achieves the supramolecular self-assembly of CNTs through the π-π interaction without damaging CNTs, thereby realizing the dispersion of CNTs.

(2) In order to ensure the intrinsic characteristics of CNTs and improve the dispersion of CNTs without destroying the surface structure of CNTs, the present invention provides a polymer based on EDOT, which can effectively disperse CNTs under the action of a conventional organic solvent, thereby promoting the application of CNTs in composite materials. The present invention has great application potential in the fields of instruments and medical devices.

(3) The synthesis method of the present invention has advantages, such as simple operations, controllable process parameters, and low cost in raw materials and equipment.

DETAILED DESCRIPTION OF PREFERRED EMBODIMENTS

Figure 1:
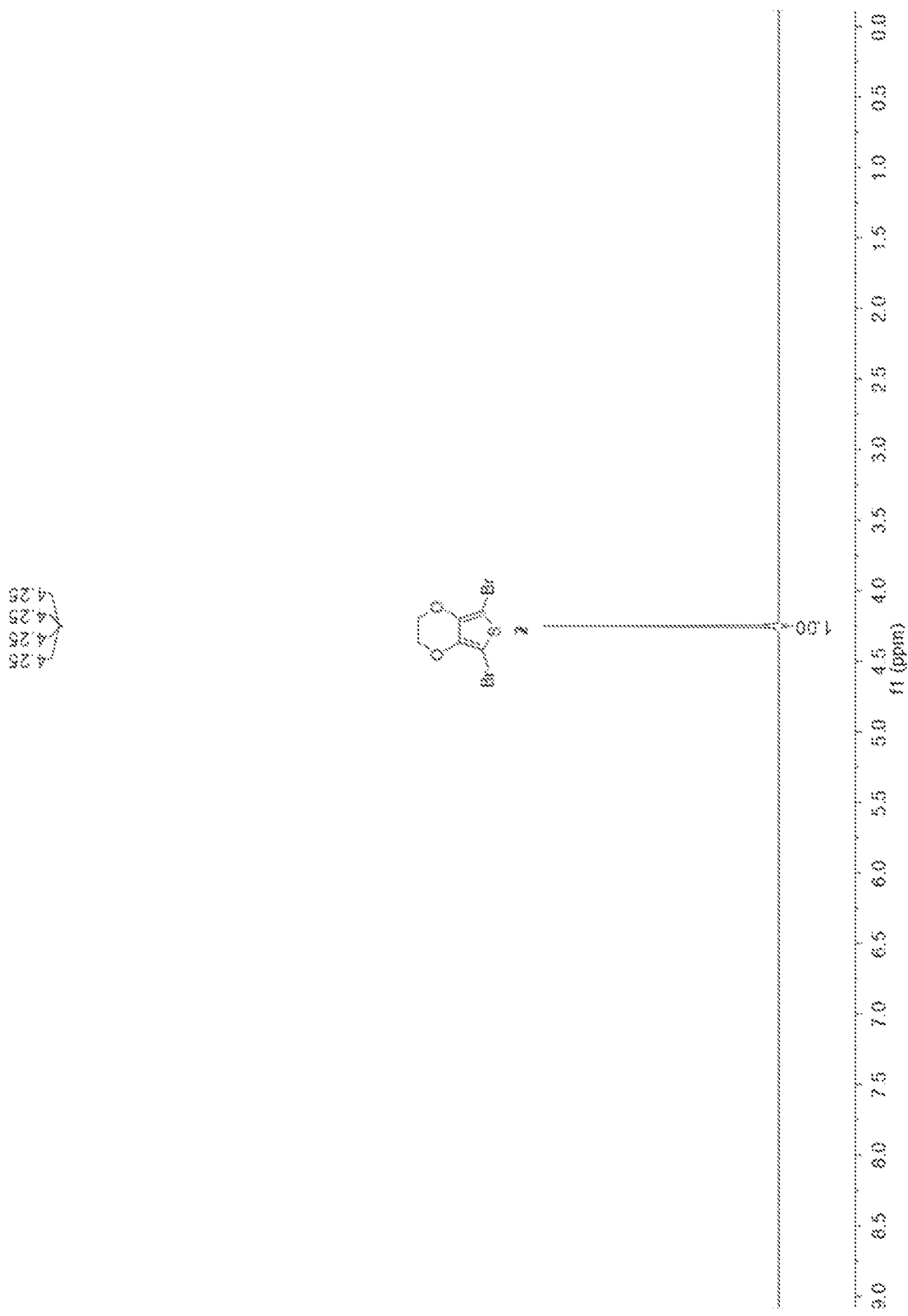
FIG. 1 shows the nuclear magnetic resonance (NMR) spectrum r 2,5-dibromo-3,4-ethylenedioxythiophene 2.
Figure 2:
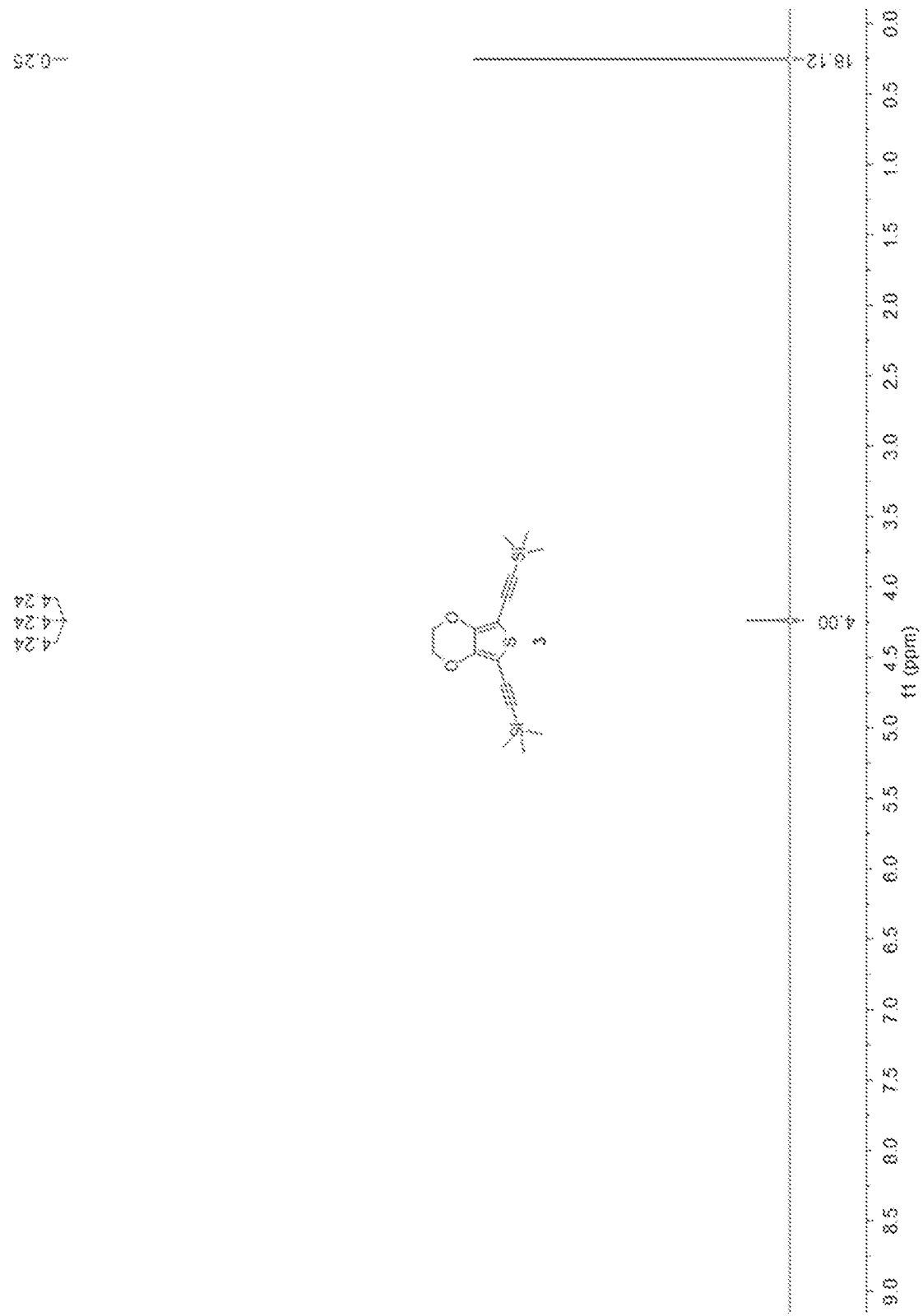
FIG. 2 shows the NMR spectrum for the bis(trimethylsilyl)-3,4-ethylenedioxythiophene.
Figure 3:
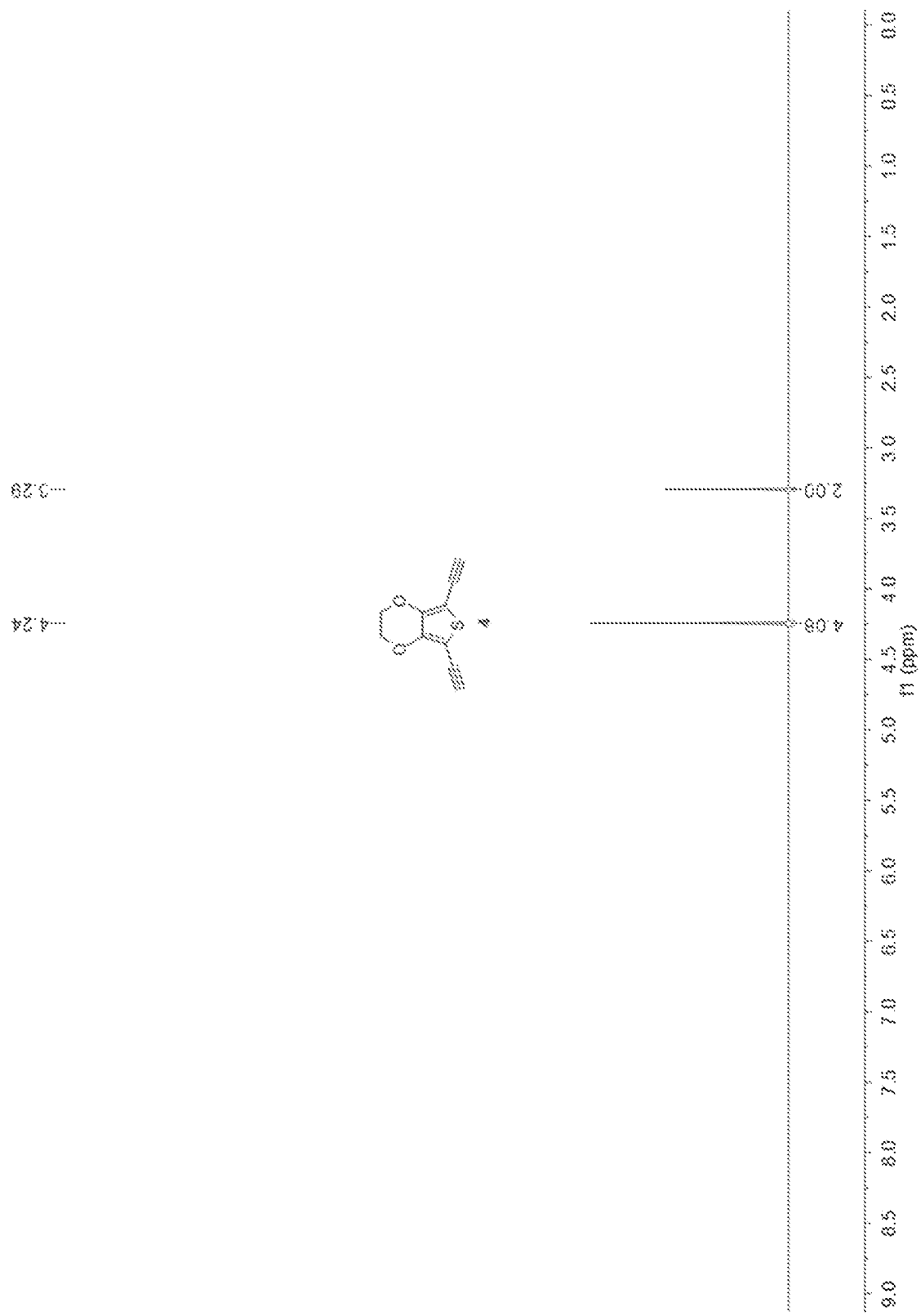
FIG. 3 shows the NMR spectrum for the alkynyl-terminated 3,4-ethylenedioxythiophene.
Figure 4:
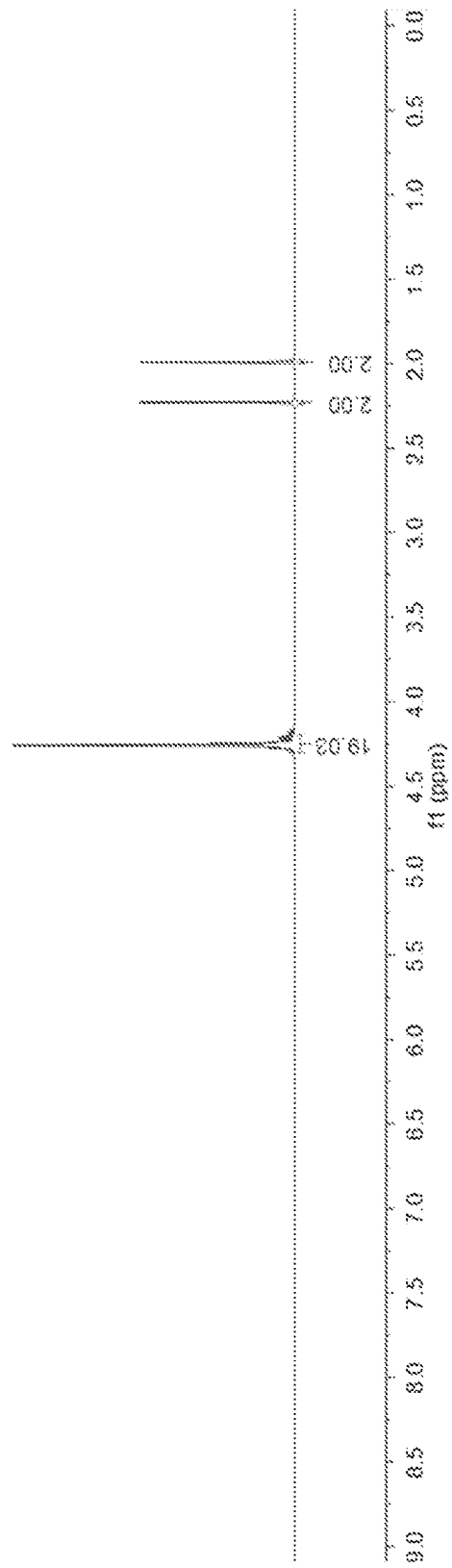
FIG. 4 shows the NMR spectrum for an EDOT polymer of the present invention.

In order to further illustrate the present invention, the present invention will be described in detail below in conjunction with examples and accompanying drawings. The accompanying drawings are provided for further explanation of the present application. The schematic examples of the present application and description thereof are provided to illustrate the present application and do not constitute an undue limitation to the present application. Unless otherwise specified, all technical and scientific terms used herein have the same meaning as commonly understood by one of ordinary skill in the technical field to which the present application belongs.

Example 1

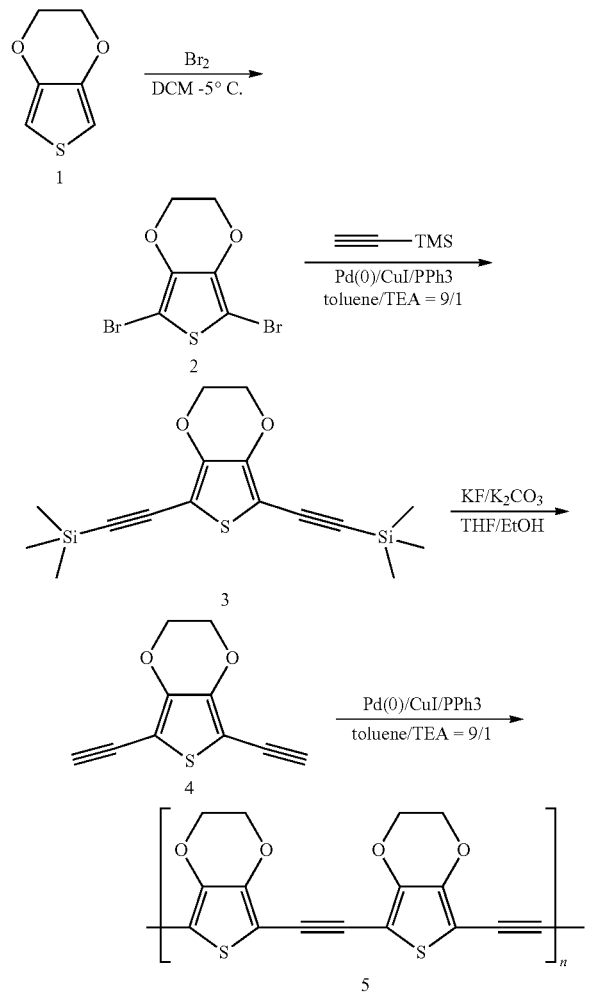

Preparation Process of EDOT Polymer 5

Intermediates 2 to 4 were synthesized according to the steps reported in Chem. Eur. J. 2011, 17, 1473-1484. The 2,5-dibromo-3,4-ethylenedioxythiophene 2 was a white solid, $^1$H NMR (500 MHz, Chloroform-d) δ 4.26-4.24 (m, 4H). The bis(trimethylsilyl)-3,4-ethylenedioxythiophene 3 was a white solid, NMR (500 MHz, Chloroform-d) δ 4.24 (m, 4H), 0.25 (s, 18H). The alkynyl-terminated 3,4-ethylenedioxythiophene 4 was a white solid, $^1$H NMR (500 MHz, Chloroform-d) δ 4.24 (s, 4H), 3.29 (s, 2H).

Polymer 5: Under a nitrogen atmosphere, 2,5-dibromo-3,4-ethylenedioxythiophene 2 (3.0 g, 10 mmol), alkynyl-terminated 3,4-ethylenedioxythiophene (1.9 g, 10 mmol), CuI (0.19 g, 1 mmol), tetrakis(triphenylphosphine)palladium(0) (0.24 g, 0.2 mmol) and triphenylphosphine (0.13 g, 0.5 mmol) were added to a dry 250 mL three-necked flask, and then 100 mL of dried toluene and 20 mL of TEA were added; after nitrogen replacement was conducted three times, and the mixture reacted at 70° C. for 24 h; the reaction system was cooled to room temperature, then subjected to extraction, dried, and concentrated by rotary evaporation to give a yellow viscous liquid; and the yellow viscous liquid was subjected to methanol/THF precipitation to give 2.6 g of yellow-green solid powder. $^1$H NMR (500 MHz, Chloroform-d) δ 4.26 (m, 19H), 2.23 (s, 2H), 1.99 (s, 2H).

The afore-mentioned is merely a preferred example of the present invention. All equivalent changes and modifications made in accordance with the claims of the present invention shall fall within the scope of the present invention.

What is claimed is:

1. A method for preparing a 3,4-ethylenedioxythiophene (EDOT) polymer capable of supramolecular assembly with carbon-based materials, having a general structure shown in the following formula:

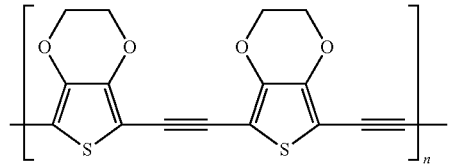

wherein n is a natural number greater than zero, comprising the following specific steps:
(1) subjecting EDOT to bromination to give 2,5-dibromo-3,4-ethylenedioxythiophene;
(2) reacting the 2,5-dibromo-3,4-ethylenedioxythiophene with trimethylsilyl acetylene (TMS) to give bis(trimethylsilyl)-3,4-ethylenedioxythiophene, and then removing the trimethylsilyl (TMs) groups from the bis(trimethylsilyl)-3,4-ethylenedioxythiophene to give alkynyl-terminated 3,4-ethylenedioxythiophene; and
(3) subjecting the alkynyl-terminated 3,4-ethylenedioxythiophene and 2,5-dibromo-3,4-ethylenedioxythiophene to Sonogashira coupling to produce an EDOT polymer.

2. The preparation method according to claim 1, wherein the Sonogashira coupling is conducted by the following specific steps: under a nitrogen atmosphere, adding 2,5-dibromo-3,4-ethylenedioxythiophene, alkynyl-terminated 3,4-ethylenedioxythiophene, CuI, tetrakis(triphenylphosphine)palladium(0) and triphenylphosphine to a reaction flask, and then adding toluene and triethylamine (TEA); after nitrogen replacement is conducted, subjecting the mixture to reaction at high temperature; then subjecting the reaction solution to cooling, extraction, drying and concentration to give a yellow viscous liquid; and then subjecting the yellow viscous liquid to methanol/tetrahydrofuran (THF) precipitation to give a yellow solid powder.

3. The preparation method according to claim 2, wherein, the high-temperature reaction is conducted at 65° C. to 75° C.

4. The preparation method according to claim 3, wherein, the high-temperature reaction is conducted at 70° C.

5. The preparation method according to claim 4, wherein the high-temperature reaction is conducted for 24 h.

6. The preparation method according to claim 1, wherein, the brominating agent used for bromination is bromine water, and the EDOT and bromine water have a molar ratio of 1:(2.0-2.5).

7. The preparation method according to claim 2, wherein, the brominating agent used for bromination is bromine water, and the EDOT and bromine water have a molar ratio of 1:(2.0-2.5).

8. The preparation method according to claim 6, wherein, the EDOT and the bromine water have a molar ratio of 1:(2.1-2.5).

9. The preparation method according to claim 7, wherein, the EDOT and the bromine water have a molar ratio of 1:(2.1-2.5).

* * * * *